June 26, 1951 R. J. MULLEN 2,558,660
BORDER LIGHTING FOR MOTION-PICTURE PROJECTION
Filed March 3, 1948

INVENTOR.
RAYMOND J. MULLEN
BY Charles R. Fay,
atty.

Patented June 26, 1951

2,558,660

UNITED STATES PATENT OFFICE 2,558,660

BORDER LIGHTING FOR MOTION-PICTURE PROJECTION

Raymond J. Mullen, Leominster, Mass.

Application March 3, 1948, Serial No. 12,767

6 Claims. (Cl. 88—16.4)

This invention relates to the provision of means for producing a border of light projected as a frame about a motion picture screen, particularly for use with color film so as to lend depth and three dimensional effects to the picture being screened, and to render the color of the picture truer to the eye.

The principal object of the invention is the provision of a separate lighting means dissociated from the film but directed and masked to be projected about the screen, at least on three sides thereof and providing what is herein referred to as "atmosphere" lighting.

Another object of the invention is the provision of a moving film of vari-colored, light transparent material which may be timed to the progress of the play being screened so as to provide different color effects for different scenes on the screen. However, it is to be understood that the colored film would progress at a very slow rate of speed whereas the picture-projecting film, of course, proceeds at a normal rate, for the reason that it is not necessary to have as long a film for the color atmosphere lighting, it being required only to have the equivalent of one frame for each separate scene of the picture film.

This invention also has for an object a new and improved mask to be used to provide the border atmosphere lighting from a fixed source of light and using several different color filters therefor, so that the color on the atmosphere lighting for the border of the screen may be manually changed as desired by the operator.

Other objects and advantages of the invention will appear hereinafter.

Reference is to be had to the accompanying drawings in which

Figure 1:
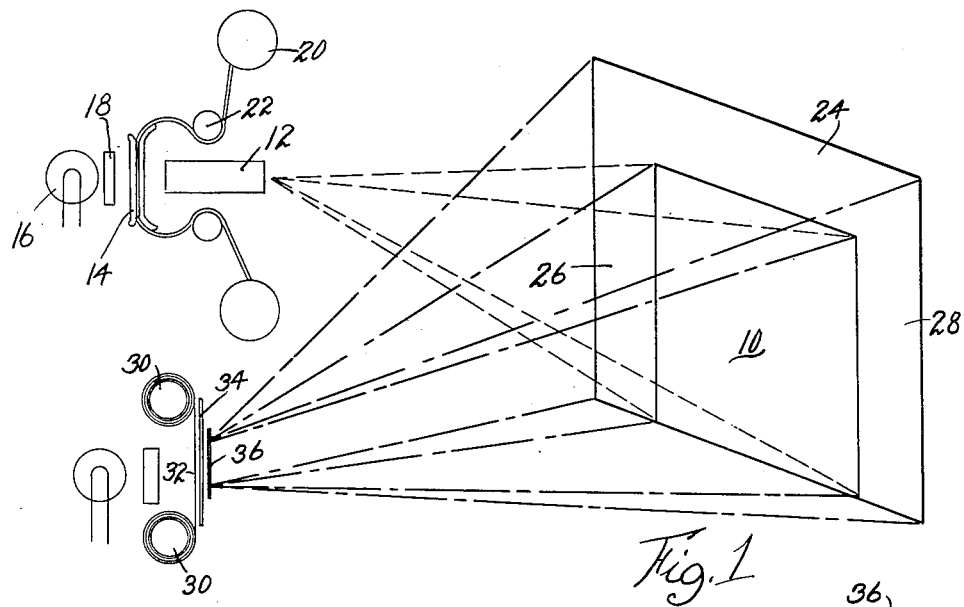
Fig. 1 is a diagrammatical view illustrating a motion picture projector screen and color film projector for the atmosphere border lighting.

In Fig. 1 the numeral 10 represents a screen upon which a picture may be projected by a projector having a focusing lens 12, a shutter 14, source of light 16, lens 18, and film feeding apparatus of any conventional type illustrated by the reels 20 and sprocket rolls 22.

It will be seen that lens 12 projects the film on the screen and only on the screen 10, leaving a wide border 24, 26, and 28.

The wide border 24, 26, and 28, may be built up into an ornamental frame but in any case, this area is to be lighted by color effects corresponding to the progress of the screen being shown. For instance, it is obvious that an extremely decorative effect will be produced by showing a brilliantly lighted desert scene with a light amber border; and conversely a night scene should be provided with a deep blue border. Other color scenes would take colors and shades of colors in between these two extremes, but in any case, the atmosphere light will improve the quality of the film to a great extent because of the fact that colors cannot be seen accurately in a pitch black border. Thus the "atmosphere" of the picture is projected and displayed.

Figure 2:
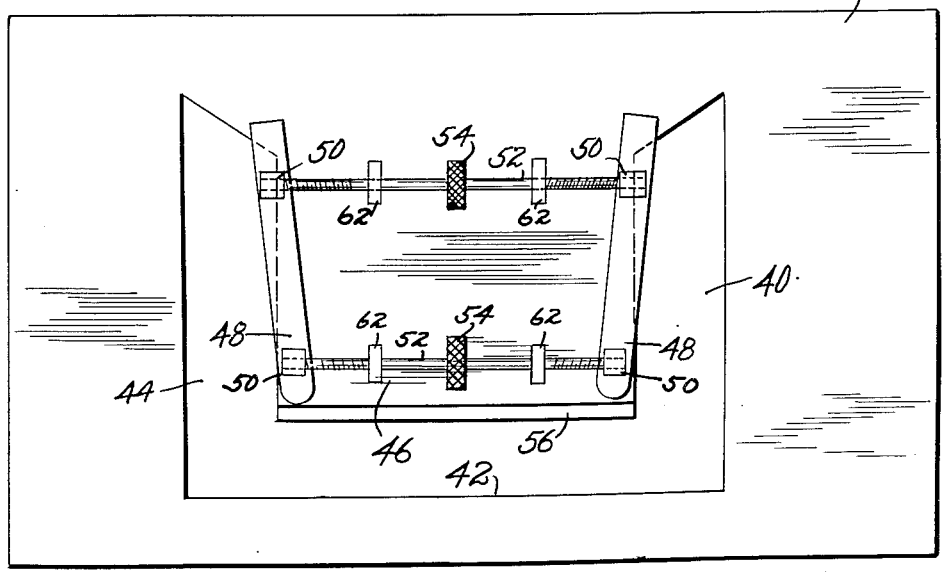
Fig. 2 is an enlarged view of a mask.
Figure 3:
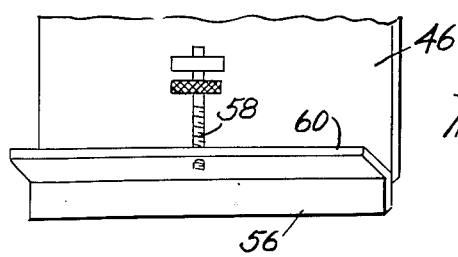
Fig. 3 is a view of the center part of the mask of Fig. 2 but showing the reverse side thereof.

Rolls 30 may be motor driven to project a film 32 through a color filter 34 and mask 36, onto the screen bordering the picture at 10. The way in which this is done is to provide a mask as illustrated in Fig. 2, wherein a sheet of mask material 36 is apertured at 40, 42, and 44, so that light passed through the same will assume the U-shaped form illustrated in Fig. 1. This, of course, requires the provision of a central block 46 to black out the screen 10. Film 32 may be colored or varied-colored itself.

The keystone effect ordinarily produced may be obviated by the use of a pair of pivoted fingers 48, each of which is provided with a pair of spaced swivel nuts 50 engaged with right and left hand screw threaded rods 52 and rotatable by nuts 54, so that the degree of keystoning may be controlled by moving a separate end piece 56 up and down by means of a screw thread rod 58 engaged with a flange 60 on the back of the block 46. The rods 52 are held in place by brackets 62.

This mask is adjustable from each end of the fingers for wear projection and television.

The filters 34 may comprise many different colors which can be inserted one by one as desired by the operator to provide the atmosphere lighting which would be consistent for the scene being shown.

It is one of the concepts of this invention to provide a special atmosphere lighting film for each picture film, the colors and shades of the special film to correspond to the scenes of the picture film. It is to be understood that the colored film would progress at a very slow rate of speed whereas the picture-projecting film, of course, proceeds at a normal rate, for the reason that it is not necessary to have as long a film for the color atmosphere lighting, it being required only to have the equivalent of one frame for each separate scene of the picture film.

This invention is seen to provide, very simply, screen frame lighting effects to carry out the atmosphere of the play or scene, improve the color of color film as seen on a screen, and lend depth and a third dimension, in effect, to the portrayal on the screen.

Having thus described my invention and the advantages thereof, I do not wish to be limited to the details herein disclosed otherwise than as set forth in the claims, but what I claim is:

1. The combination of a conventional color picture film and a projector for projection of said film onto a screen, with a second projector for a separate vari-colored non-picture, film coinciding throughout its length with the characteristic or ground color of the conventional picture film for projection about the screen as a frame for the pictured scenes, the non-picture film being considerably shorter and said projector therefor moving the same at a slower feed than the picture film.

2. The combination of a conventional color picture film and a projector for projection of said film onto a screen, with a second projector for a separate vari-colored non-picture, film coinciding throughout its length with the characteristic or ground color of the conventional picture film for projection about the screen as a frame for the pictured scenes, the non-picture film being considerably shorter and said projector therefor moving the same at a slower feed than the picture film, and said non-picture film having color changes for each scene of the picture film over a length corresponding to a usual film frame.

3. The combination of claim 1, and a U-shaped mask for the non-picture film, said mask preventing light passing through the film from falling on the screen.

4. The combination of claim 1, and a mask for the non-picture film only, said mask providing a U-shaped aperture so that light from the mask film falls only about the screen to provide an atmosphere lighting frame therefor.

5. A picture screen projector mask for defining an uninterrupted U-shaped frame about a screen, said mask comprising a sheet of opaque material having a U-shaped aperture therein, a pivoted finger swively mounted thereon at each side of the U, and means swively adjusting the fingers simultaneously and to the same degree to compensate for keystone effect.

6. The mask of claim 5 including a blade at the closed side of the U and means to rectilinearly adjust the same to vary the width of said closed side of the U.

RAYMOND J. MULLEN.

REFERENCES CITED

The following references are of record in the file of this patent:

UNITED STATES PATENTS

| Number | Name | Date |
|---|---|---|
| 1,006,292 | Schneider | Oct. 17, 1911 |
| 1,102,595 | Knight | July 7, 1914 |
| 1,133,412 | Stone | Mar. 30, 1915 |
| 1,156,896 | Garrette | Oct. 19, 1915 |
| 1,349,580 | Paradis | Aug. 17, 1920 |
| 1,461,133 | Martin | July 10, 1923 |
| 1,503,488 | Craver | Aug. 5, 1924 |
| 1,951,707 | Preddy | Mar. 20, 1934 |
| 2,047,474 | Howell | July 14, 1936 |
| 2,297,345 | Bowen | Sept. 29, 1942 |
| 2,383,493 | Mercer | Aug. 28, 1945 |

FOREIGN PATENTS

| Number | Country | Date |
|---|---|---|
| 514,673 | Great Britain | Nov. 15, 1939 |
| 524,579 | Great Britain | Aug. 9, 1940 |